United States Patent [19]

Scala et al.

[11] Patent Number: 4,533,448

[45] Date of Patent: Aug. 6, 1985

[54] AMINE-FREE AND SURFACTANT-FREE ELECTRODEPOSITION OF POLYESTERS, POLYAMIC ACIDS, POLYIMIDES, AND POLYAMIDE-IMIDES

[75] Inventors: Luciano C. Scala, Murrysville; William M. Alvino, Penn Hills; Timothy J. Fuller, Pittsburgh, all of Pa.

[73] Assignee: Westinghouse Electric Corp., Pittsburgh, Pa.

[21] Appl. No.: 350,499

[22] Filed: Feb. 19, 1982

[51] Int. Cl.³ ................................................ C08K 5/07
[52] U.S. Cl. .................................. 204/181.7; 524/361; 524/364; 524/901
[58] Field of Search .............. 524/589, 590, 600, 606, 524/607, 361, 364, 901; 204/181 C

[56] References Cited

U.S. PATENT DOCUMENTS 3,943,065  3/1976  Phillips ................................. 252/500
4,053,444 10/1977  Phillips ................................. 204/181
4,229,339 10/1980  Bentley ................................. 524/606
4,299,752 10/1981  Armour ................................. 524/361

*Primary Examiner*—Paul R. Michl
*Attorney, Agent, or Firm*—Richard D. Fuerle

[57] ABSTRACT

Disclosed is an electrodepositable emulsion which comprises a soluble un-ionized polymer containing an amic acid or amide linking group, a non-electrolyzable organic solvent for the polymer and a non-electrolyzable organic non-solvent for the polymer. The weight ratio of the solvent to the non-solvent is about 0.1 to about 0.5 and the polymer is about 0.4 to about 5% by weight of the weight of the solvent. No amine or surface active agent is used. A workpiece is coated with the polymer by placing it into the emulsion about one-half to about two inches away from the cathode. Constant dc voltage is applied between the cathode and the workpiece until a coating of a desired thickness has been deposited on the workpiece. The workpiece is then removed, dried, and cured.

7 Claims, No Drawings

AMINE-FREE AND SURFACTANT-FREE ELECTRODEPOSITION OF POLYESTERS, POLYAMIC ACIDS, POLYIMIDES, AND POLYAMIDE-IMIDES

BACKGROUND OF THE INVENTION

High performance, flaw-free coatings of electrical insulation are highly desirable for applications in the aerospace and other industries. One route to such coatings is by electrophoretic deposition whereby a resin migrates in an electric field to a charged workpiece, depositing a coating thereon. Because the resin seeks out areas of greatest charge density, the resulting coatings tend to be pinhole free.

The high performance resins which are most suited to electrophoretic deposition, are those containing aromatic polyamic acid linkages. When cured, these resins condense out water, forming a polyimide. Until now, it was believed that polyamic acid polymers could not be electrophoretically deposited unless they were in the form of a salt. A salt was produced by reacting the free carboxyl group of the polyamic acid with an amine or a surface active agent. The charge on the salt was thought to be necessary to cause the polyamic acid to migrate to the oppositely charged workpiece. Because amines are basic, previous electrodeposition of polyamic acids were conducted in an emulsion having an apparent pH of about 8 to about 10.

SUMMARY OF THE INVENTION

We have discovered that not only is it unnecessary to form a salt of the polyamic acid with an amine or surface active agent in order to obtain electodeposition, but the absence of these ionizing agents results in a significantly improved process and product. Leaving out the amine means that the expense and trouble of adding an additional ingredient are avoided, which is important due to the generally malodorous nature of amines. In addition, amines are volatile and can boil during cure, resulting in blisters in the coating.

While those advantages to omitting the amine might be expected, we were quite surprised to also discover that the coating yield increased per coulomb when the amine was omitted. In addition, the coating was smoother and had better dielectric properties than when the amine was present.

PRIOR ART

U.S. Pat. Nos. 4,053,444, 3,943,065 and 4,019,877 disclose the electrodeposition of polyamic acids from basic emulsions which contain an amine.

U.S. Pat. No. 3,676,383 discloses the electrophoretic deposition of polyamic acids from solutions. A surface active agent is used to form a salt with the polymer.

DESCRIPTION OF THE INVENTION

The coatings formed by the process of this invention contain either amide linkages, imide linkages, both amide and imide linkages or ester linkages. They may also contain ester, urethane, or epoxy linkages as well. In order to produce coatings containing an amide or imide linkage, the emulsion polymer must contain amide, amic acid, or imide linkages. The preferred emulsion polymer, which contains both amic acid and amide linkages, is the reaction product of trimellitic anhydride or pyromellitic dianhydride and an aromatic diamine or the reaction product of trimellitic acid or pyromellitic acid with aromatic diisocyanates. Aromatic diamines or diisocyanates containing either ether or methylene linkages are preferred as they have the best properties. Examples of suitable aromatic diamines include m-phenylenediamine, methylenedianiline, diaminodiphenyl ether, and diaminobenzanilide. Diisocyanates with similar organic radicals can be used. While trimellitic anhydride is preferred, tetracarboxylic acids or dianhydrides such as pyromellitic tetracarboxylic acid or dianhydride and 3,3',4,4'-benzophenone tetracarboxylic acid or dianhydride may be used to form polyimides. The emulsion polymer of this invention is non-ionized, by which it is meant that less than 5% of the carboxylic acid groups are ionized.

To form an emulsion it is necessary to have both a non-electrolyzable organic solvent and a non-electrolyzable organic non-solvent or precipitant present. Suitable solvents include N-methylpyrrolidinone, dimethylsulfoxide, dimethylformamide, dimethyl acetamide, metacresol and pyridine. The preferred solvent is N-methylpyrrolidinone because it gives better yields.

Suitable non-solvents include acetonitrile, methyl ethyl ketone, methanol, nitromethane, nitroethane, ethyl acetate, propylene carbonate, diglyme and tetrahydrofuran. The preferred non-solvents are acetonitrile ($CH_3CN$) and methyl ethyl ketone (MEK) as they produce the best quality coatings.

The weight ratio of the solvent to the non-solvent in the emulsion should be about 0.1 to about 0.5 because at less than 0.1 it is difficult to form an emulsion, and at greater than 0.5 a precipitate may form. The weight percentage of polymer in the solvent should be about 0.4 to about 5 because at less than 0.4 an emulsion may not form and at greater than 5 the resin may precipitate. The emulsion can be produced by simply mixing together the polymer, dissolved in the solvent, and the non-solvent. The non-solvent forms the continuous phase and the solvent, with the polymer dissolved therein, forms the discrete phase. Care should be taken to avoid the presence of water and humidity, as water adversely affects the properties of the coating. The emulsion should not contain any compound, such as an amine or a surface active agent, which will ionize the polymer. Electrodeposition is preferably performed at a temperature of about 10° to about 25° C. as higher temperatures may coagulate the emulsion and, while lower temperatures may be used, there is no particular advantage to them. The apparent pH of the emulsion need not be adjusted but it will always be less than 7.

Any conductor may serve as the workpiece and can be coated by the polymer including gallium arsenide, graphite, and metals. The workpiece is made the anode and is positioned about one-half to about two inches away from the cathode, which is typically made of aluminum, nickel, steel, brass, or some other conductive material. A dc voltage potential is then applied between the anode and cathode until a coating of the desired thickness is obtained. Either the current or the voltage may be held constant, but it is preferable to maintain a constant voltage, preferably between about 10 to about 300 volts, as when a constant voltage is used one can easily determine when the coating is completed by monitoring the current decay as a function of time. High voltages are used for complicated shapes and lower voltages for simple shapes. Typically, coating is complete in about one minute to three hours, depending upon the emulsion composition, the electrical conditions used, and the intricacy of the anode shape.

Once the workpiece has been coated, it should be removed and air dried for about one-half hour to several hours to evaporate the liquids. This is preferably conducted at about 40° C. as that temperature is high enough to keep water from being absorbed by the coating. The coating is then cured to harden it. Curing should be carefully performed to avoid blisters. This can be accomplished, for example, by increasing the temperature by 5° C. every hour from a temperature of 40° C. up to the curing temperature, which may be as high as about 300° C. The following examples further illustrate this invention.

EXAMPLE 1

In this example the resin used was either a polyamic acid sold by Amoco under the trade designation AI-10HL, believed to be poly (trimellito p,p'-diamine diphenyl ether) [prepared by either reacting trimellitic acid or anhydride with diamino diphenyl ether or by reacting trimellitic acid with p,p'-diphenyl ether diisocyanate] (resin I) or a 16.5% by weight solution of polyamic acid in N-methyl-2-pyrrolidimone (NMP) sold by DuPont under the trade designation "Pyre ML" (resin II). The solvent was either NMP or dimethyl sulfoxide (DMSO). Emulsions were prepared by mixing the resin, solvent, and non-solvent. Aluminum rods (8 inches by 0.25 inches diameter) were coated at room temperature and one immersion at 100 VDC/60 sec. The following table gives the coating parameters, the emulsion compositions and the yield.

The above table shows that coatings can be obtained without the presence of an amine in the emulsion. The best resins for electrodeposition were formulations 3, 5, and 8.

EXAMPLE 2

Between zero and three equivalents of NMP was added to 0.84 grams of resin I (see Example 1) dissolved in 9.0 grams of DMSO. The resulting solution was then added to 131 grams of MEK. The following table shows how varying the amine to resin ratio affected the yield, conductivity, and pH. The resin was coated using the same conditions as in Example 1.

TABLE TO EXAMPLE 2

(0 to 3 eg. of NMP added to 0.84 resin I in DMSO (9 g). The non-solvent was MEK (131 g).

| Formulation No. | Molar Equivalents NMP/resin I | Electro-Coated Yield (mg) | Coulombs | i(mA) | Z(mg/coul) | Faraday Equiv. $e \times 10^{-4}$ | Apparent pH |
|---|---|---|---|---|---|---|---|
| 1 | 0 | 26.0 | 0.06244 | 1.3→0.8 | 416.4 | 4.02 | 6.5 |
| 2 | 0.2282 | 25.0 | 0.06620 | 1.25→0.7 | 377.6 | 3.64 | 6.4 |
| 3 | 0.3144 | 20.7 | 0.07247 | 1.4→0.7 | 285.6 | 2.76 | 6.2 |
| 4 | 0.5435 | 22.8 | 0.05462 | 1.2→0.5 | 417.4 | 4.03 | 6.1 |
| 5 | 0.6167 | 23.3 | 0.06466 | 1.2→0.6 | 360.3 | 3.48 | 5.9 |
| 6 | 0.8381 | 21.7 | 0.06369 | 1.15→0.5 | 340.7 | 3.29 | 5.9 |
| 7 | 1.0115 | 21.9 | 0.05095 | 1.0→0.4 | 429.8 | 4.15 | 5.8 |
| 8 | 1.5145 | 21.7 | 0.05790 | 1.0→0.3 | 374.8 | 3.62 | 5.8 |
| 9 | 2.045 | 23.3 | 0.06437 | 1.1→0.2 | 362.0 | 3.49 | 5.6 |
| 10 | 3.054 | 17.8 | 0.04536 | 1.1→0.3 | 392.4 | 3.79 | 5.6 |

The above table shows that NMP had little or no influence on the electrodeposition of resin I since the yield, conductivity, and pH were all nearly independent of the amount of NMP added to the emulsion. The reason this amine had no effect is that it is too weak to ionize the carboxylic acid groups on the resin. Nevertheless, the highest electrodeposited yield of resin I was obtained using an emulsion to which no NMP was added.

EXAMPLE 3

Between zero and three equivalents of the strong base triethylamine was added to 0.84 grams of resin I in 9.0 grams of DMSO, and this solution was added to 131 grams of methyl ethyl ketone. The resin was electrodeposited using the same method as in Example 1. The following table shows the relationship between the molar ratio of amine to resin and the yield.

| Formulation No. | Resin (g) | Solvent (g) | Non-Solvent (g) | i (mA) | Coulombs (t = 60 sec) | Yield (mg) | Z (mg/Coulomb) | e ($\times 10^{-3}$)$^a$ | Apparent pH |
|---|---|---|---|---|---|---|---|---|---|
| 1 | I (0.84) | NMP (13) | Ethyl Acetate (127) | <0.1 | 0.00367 | 15.0 | 4087 | 394.0 | 4.9 |
| 2 | I (1.26) | NMP (23) | Acetonitrile (117) | 13.4→6.3 | 0.523 | 77.2 | 148 | 14.2 | — |
| 3 | I (1.26) | NMP (28) | Acetonitrile (112) | 14.8→1.4 | 0.298 | 32.2 | 108 | 10.4 | 6.3 |
| 4 | I (0.98) | DMSO (11) | Ethyl Acetate (129) | 0.085→0.078 | 0.00584 | 9.7 | 1662 | 160.0 | — |
| 5 | I (0.98) | NMP (13) | Methyl Ethyl Ketone (127) | 4.4→1.1 | 0.131 | 23.4 | 179 | 17.3 | 4.4 |
| 6 | I (0.98) | NMP (10) | Acetonitrile (130) | 8.0→5.0 | 0.365 | 76.0 | 208 | 20.1 | 5.6 |
| 7 | I (0.98) | DMSO (28) | Acetonitrile (112) | 8.2→4.0 | 0.3489 | 27.8 | 79.7 | 7.69 | 5.6 |
| 8 | I (0.84) | DMSO (9) | Methyl Ethyl Ketone (131) | 1.4→0.9 | 0.0805 | 24.3 | 302 | 29.1 | 6.5 |
| 9 | I (1.12) | DMSO (9) | Methyl Ethyl Ketone (131) | 1.8→0.8 | 0.0899 | 25.5 | 284 | 27.4 | 6.7 |
| 10 | II (10.1) | NMP (44.4) | Acetone (204) | 6.8→4.2 | 0.330 | 24.9 | 75.5 | 7.28 | 4.4 |
| 11 | I (0.84) | NMP (17.5) | Acetone (122.5) | 8→2 | 0.1936 | 19.9 | 167.8 | 16.2 | 5.1 |
| 12 | None | NMP (17.5) | Acetone (122.5) | 1→1.3 | 0.0690 | — | — | — | 12.1 |
| 13 | None | NMP (17.5) | Acetonitrile (122.5) | 0.7→0.9 | 0.0483 | — | — | — | 10.6 |
| 14 | None | NMP (17.5) | Ethyl Acetate (122.5) | <0.2 | 0.00251 | — | — | — | 10.4 |
| 15 | None | DMSO (9) | Methyl Ethyl Ketone (131) | — | — | — | — | — | 7.8 |

$^a$The Faraday electrochemical molecular weight (e) was calculated using the equation, $e = Z \times 96.5$ coulombs/mg Faraday.

TABLE TO EXAMPLE 3

(0 to 3 eg. of TEA 0.84 g resin I in 9.0 g DMSO added to 131 g MEK)

| Formulation No. | Molar Equivalents Triethylamine/ Resin I | Electro- Coated Yield (mg) | Coulombs | i(mA) | Z(mg/coul) | Faraday Equiv. e × $10^{-4}$ | Apparent PH |
| --- | --- | --- | --- | --- | --- | --- | --- |
| 1 | 0 | 25.7 | 0.08203 | 1.6→0.07 | 313.3 | 3.02 | 6.4 |
| 2 | 0.1931 | 13.4 | 0.5388 | 19.3→4.7 | 24.9 | 2.40 | 6.6 |
| 3 | 0.3099 | 25.0 | 0.7898 | 24.8→7.0 | 31.7 | 3.05 | 6.8 |
| 4 | 0.5956 | 15.5 | 0.9790 | 26.2→10.0 | 15.8 | 1.53 | 7.3 |
| 5 | 0.5070 | 15.9 | 0.8931 | 26.0→8.3 | 17.8 | 1.72 | 7.2 |
| 6 | 0.9209 | 18.3 | 1.0012 | 25.3→9.4 | 18.3 | 1.76 | 7.7 |
| 7 | 1.5187 | 22.4 | 1.1100 | 27.0→11.5 | 20.2 | 1.95 | 8.0 |
| 8 | 1.0412 | 18.5 | 0.9660 | 25.5→10.2 | 19.2 | 1.85 | 7.9 |
| 9 | 2.0022 | 23.0 | 1.0327 | 25.6→12. | 22.3 | 2.15 | 8.0 |
| 10 | 2.9782 | 24.3 | 0.9747 | 25.9→11 | 24.9 | 2.41 | 8.2 |

The *highest yield* of electrodeposited resin was *obtained when no amine* was added to the emulsion. The yield dropped dramatically when a small amount of triethylamine was added to the colloid but then increased when more triethylamine was added. The explanation is believed to be that in the absence of triethylamine, resin I is being coated. As triethylamine is added, some carboxylic acid groups on the resin are converted to the amine salt and the salt is electrodeposited. All of the carboxylic acid groups on the resin are converted to carboxylic salt when more than 1.5 equivalents of triethylamine are added per equivalent of resin. (This happens at pH 7.8). The electrodeposition of the nonionized resin is more efficient than that of the salt of the resin which in turn is more efficient than that of the intermediate species which had both carboxylic acid and carboxylate groups on the molecule. The conductivity of the emulsion increased dramatically with the addition of the amine until the number of carboxylic groups was nearly the same as the carboxylic acid groups on the polymer species in the emulsion. The conductivity was highest at the equivalence point of the resin (when all the carboxy groups were converted to carboxylate salt) and was nearly constant thereafter. The highest yield was obtained at the lowest pH of 6.3 and deposition only occurred at the anode. Even though the emulsion was suspended in an acidic environment, the overall charge on the emulsion droplet must have been negative.

EXAMPLE 4

This example illustrates the small effect that a strong base has on the electrodeposition of resin I in a non-conducting emulsion. Between zero and three equivalents of triethylamine was added to 0.84 grams of resin I that was dissolved in 11 grams of DMSO, and the solution was added to 129 grams of ethyl acetate (as the non-solvent). The emulsion was electrodeposited according to the method of Example 1. The following table gives the results.

TABLE TO EXAMPLE 4

(0 to 3 eg. of TEA + 0.84 g resin I in 11 g DMSO was added to 129 g ethylacetate)

| Formulation No. | Molar Equivalents Triethylamine/ Resin I | Electro- Coated Yield (mg) | Coulombs | i(mA) | Z(mg/coul) | Faraday Equiv. e × $10^{-3}$ |
| --- | --- | --- | --- | --- | --- | --- |
| 1 | 0 | 5.4 | 0.0586 | 0.5 | 92.2 | 8.89 |
| 2 | 0.4170 | 5.4 | 0.06176 | 0.6 | 83.0 | 8.01 |
| 3 | 0.4849 | 2.4 | 0.06697 | 0.7 | 35.8 | 3.46 |
| 4 | 0.6057 | 5.3 | 0.06755 | 0.7 | 79.1 | 7.64 |
| 5 | 0.8023 | 3.8 | 0.06591 | 0.7 | 56.3 | 5.42 |
| 6 | 1.0139 | 3.1 | 0.06244 | 0.8 | 47.0 | 4.54 |
| 7 | 1.5120 | 3.8 | 0.06610 | 1.1 1 | 60.9 | 5.87 |
| 8 | 1.9837 | 2.4 | 0.06523 | 0.8 | 36.8 | 3.55 |
| 9 | 3.0021 | 3.9 | 0.06736 | 0.6 | 57.9 | 5.59 |

There was little change in the conductivity of the emulsion or in the yield of resin deposited at the anode when increased concentrations of triethylamine were added to the emulsion. The largest yield was obtained using the emulsion without triethylamine. It is believed that the emulsion is so insulating that the ionization of resin I was not measured.

EXAMPLE 5

This example illustrates the poor influence that the combination of a weak base (NMP) and a strong base has on the electrodeposition of resin I in a non-conducting emulsion. Between zero and three gram equivalents of a strong base, triethylamine, 13 grams NMP, 0.56 grams of resin I and 127 grams of ethyl acetate were mixed. The following table gives the results.

TABLE TO EXAMPLE 5

(0 to 3 eg. TEA 13 eg. NMP, 0.56 g resin I, ethylacetate (127 g))

| Formulation No. | Molar Equivalents Triethylamine/ Resin I | Electro- Coated Yield (mg) | Coulombs | i(mA) | Z(mg/coul) | Faraday Equiv. e × $10^{-4}$ |
| --- | --- | --- | --- | --- | --- | --- |
| 1 | 0 | 9.1 | 0.0135 | 0.01 | 674.0 | 6.50 |
| 2 | 0.27 | 9.1 | 0.0239 | 0.02 | 380.8 | 3.67 |

TABLE TO EXAMPLE 5-continued (0 to 3 eg. TEA 13 eg. NMP, 0.56 g resin I, ethylacetate (127 g))

| Formulation No. | Molar Equivalents Triethylamine/ Resin I | Electro- Coated Yield (mg) | Coulombs | i(mA) | Z(mg/coul) | Faraday Equiv. e × $10^{-4}$ |
|---|---|---|---|---|---|---|
| 3 | 0.54 | 6.8 | 0.0162 | 0.01 | 419.7 | 4.05 |
| 4 | 0.99 | 6.8 | 0.0193 | 0.01 | 352.3 | 3.40 |
| 5 | 1.52 | 6.5 | 0.0289 | 0.03 | 224.9 | 2.17 |
| 6 | 1.98 | 5.6 | 0.0178 | 0.02 | 314.6 | 3.04 |
| 7 | 2.98 | 7.2 | 0.0222 | 0.06→0.04 | 324.3 | 3.13 |
| 8 | 4.0 | 7.3 | 0.0190 | 0.01 | 384.2 | 3.71 |
| 9 | 5.0 | 6.2 | 0.0170 | 0.01 | 364.7 | 3.52 |
| 10 | 10.0 | 7.1 | 0.0183 | 0.03 | 387.9 | 3.74 |
| 11 | 50. | 0.6 | 0.0241 | 0.02 | 24.9 | 0.24 |

The above table shows that there was no increase in the yield of electrodeposited resin I with increased concentration of triethylamine nor was there any significant increase in the conductivity of the emulsion. The yield, however, was highest in the absence of triethylamine.

EXAMPLE 10

The effect of triethylamine on the electrodeposition process was evaluated by using the following emulsion formulation: PDG-981 (4.67 g, 0.002995 mol) dissolved in NMP (33 g) was added to triethylamine dissolved in acetonitrile (104.3 g). Electrodeposition was carried out following the procedure described in Example 8. The results are summarized in the following table.

| Emulsion No. | Triethylamine g | Mole Ratio of Amine to Resin | Yield of Cured Resin (g) | Coulombs | Current (mA) | mg/Coulomb | e × $10^{-3}$ |
|---|---|---|---|---|---|---|---|
| 1 | 0.15 | 0.5 | 0.0325 | 0.9104 | 66→17 | 35.7 | 3.45 |
| 2 | 0.30 | 1.0 | 0.0431 | 1.1204 | 66.8→17 | 38.5 | 3.71 |
| 3 | 0.45 | 1.5 | 0.0443 | 1.1786 | 67.2→17 | 37.6 | 3.63 |
| 4 | 0.60 | 2.0 | 0.0429 | 1.1400 | 62→22 | 37.6 | 3.63 |
| 5 | 0.76 | 2.5 | 0.0529 | 1.3877 | 71→24 | 38.1 | 3.68 |
| 6 | 0.91 | 3.0 | 0.0529 | 1.3800 | 66→26 | 38.3 | 3.70 |
| 7 | 1.06 | 3.5 | 0.0538 | 1.3800 | 68→27 | 39.0 | 3.76 |
| 8 | 0 | 0 | 0.0546 | 0.4952 | 31.4→5 | 110.3 | 10.6 |

The best formulation was the one without triethylamine. (By using emulsion 7 or 8, the highest physical and coulombic yields of even coatings with the best electrical properties were obtained). The highest physical and coulombic yields, the most even coats and the best electrical properties were obtained with emulsions 7 and 8.

EXAMPLE 12

The best emulsions for the electrodeposition of PDG-981, that have been studied to date, were made by adding a solution of the resin in NMP to a non-solvent, either MEK or acetonitrile. The quantities of reagents that were used and the results are summarized in the following table.

| Emulsion No. | PDG-981 (g at 24% Solids) | NMP (g) | Precipitant (g) |
|---|---|---|---|
| 1 | 20 | 106.4 | MEK (497.2) |
| 2 | 20 | 141.3 | Acetonitrile (446.7) |

EXAMPLE 13

The two following methods were used to evaluate throwing power of resins and emulsions: (1) the Hull cell, and (2) the throw-power anode, which consists of a rod inserted into a hollow cylinder in which both serve as the anode.

(A) Hull Cell

A Hull cell was used to determine the quality of films under coating conditions that involve different electrode distances and electric field strengths. Both factors are related to throwing power. For this series of experiments, PDG-981 was studied exclusively. The following emulsions were compared:

1. With MEK

PDG-981 (10 g) dissolved in NMP (53.2 g) was added to MEK (248.6 g). Electrocoating was carried out at 100 Vdc for 5 mins. The yield of cured resin was 0.0796 g and the current decreased over the range between 4.2 and 2.0 mA.

2. With Acetonitrile

PDG-981 (9.34 g) dissolved in NMP (66 g) was added to acetonitrile (208.6 g). Electrolysis was carried out as before and the current decreased from 12.0 to 6.9 mA. The yield of cured resin was 0.1682 g.

3. With MEK/Triethylamine

PDG-981 (10 g) dissolved in NMP (53.2 g) was added to a solution of triethylamine (2.27 g) and MEK (248.6 g). Electrodeposition was carried out as described in example 12.17 and the current decreased from 9 to 5.6 mA. The yield of cured resin was 0.0458 g.

4. With Acetonitrile/Triethylamine

PDG-981 (9.34 g) dissolved in NMP (66 g) was added to a solution of triethylamine (7.0 g) in acetonitrile (208.6 g). During the electrocoating process the current decreased from 20 to 13.5 mA. The cured resin yield was 0.0840 g.

Coated anodes were heated to cure the resin at 50° for 0.5 hour, 150° for 0.5 hour, and 250° for 0.5 hour. Throw power decreased for these emulsions in the following order: Acetonitrile(2)>MEK(1)>MEK/Triethylamine(3)>Acetonitrile/Triethylamine(4). With the acetonitrile/triethylamine emulsion(4), the Hull cell anode was coated unevenly and blistering was a serious problem.

(B) Throw-Power Anode, Cylinder With Rod-Insert

As an alternative to the Hull cell, a hollow tube with a rod-insert can be used to measure throw-power. Throwing power is determined as the ratio of penetration distance of the electrodeposited resin coating on the interior rod to the immersion depth of the throwing power anode. The throwing power anode was immersed approximately 2" into an emulsion, and electrodeposition was carried out at 100 Vdc for 3 minutes using fresh emulsions that were made as described in the previous sections. The results are summarized in the following table.

| Emulsion No. | Emulsion Contents | Current (mA) | Cured Resin Yield (g) | Coulombs | mg/Coulomb | Throw-Power e | Ratio |
|---|---|---|---|---|---|---|---|
| 1 | NMP/MEK | 30.5 11.5 | 0.0239 | 3.07 | 7.7 | 751 | 0.32 |
| 2 | NMP/CH CN | 100 19 | 0.0375 | 9.53 | 3.9 | 379 | 0.35 |
| 3 | NMP/MEK/Triethylamine | 100 30 | 0.0152 | 10.49 | 1.4 | 139 | 0.25 |
| 4 | NMP/CH CN/Triethylamine | 100 76.5 | 0.0419 | 22.7 | 1.8 | 178 | 0.37 |

The cure schedule described in the previous example was used. Throwing power decreases for emulsions listed in the following order: 4>2>1>3. This order was determined on the basis of observation, on the weights gained by the center rod, and on the ratio of the distances of resin penetration. The coating obtained from emulsion 4 was badly blistered and was very uneven. Most of the weight was concentrated at the edge of the rod. Bubbling and unevenness were attributed to volatilization of amine from the resin coating. On the basis of these results, emulsion 2 appears to show the most promise for obtaining even coatings of PDG-981 with optimum throwing power. By comparison, the throwing power, which was evaluated using the Hull cell, decreased in the following order of emulsions: 2>1>3>4.

EXAMPLE 15

An electrophorettable emulsion was made by dissolving a preformed polyimide sold by Upjohn under the trade designation 2080 (0.8 g) in m-cresol (30 g) with gentle heating until a clear, orange solution was obtained. It was then added rapidly to acetonitrile (110 g), with vigorous stirring. The resultant emulsion was stable for more than 24 hours. Electrocoating was carried out at 100 Vdc at 2" anode immersion. Both cathode and anode were aluminum panels (1"×8"×1.25 mils). The electrode gap was 1". The yield was 0.1242 g of dry resin. The current decreased from 6.3 to 0.95 mA and 0.2494 coulomb was used. Films that were made using this method were uniform, flaw-free, and when tested, had breakdown voltages in excess of 1.6 kV/mil of film thickness.

We claim:

1. A method of electrodepositing polyamic acids on a workpiece comprising
   (A) preparing an emulsion which comprises
      (1) a soluble un-ionized polymer containing a linking group selected from the group consisting of amic acid, amide, imide, and mixtures thereof;
      (2) a non-electrolyzable organic solvent for said polymer which forms the discontinuous phase of said emulsion; and
      (3) a non-electrolyzable organic non-solvent for said polymer which forms the continuous phase of said emulsion, where the weight ratio of said solvent to said non-solvent is about 0.1 to about 0.5, and said polymer is about 0.4 to about 5% by weight of the weight of said solvent;
   (B) placing said workpiece into said emulsion about one-half to about two inches away from a cathode;
   (C) passing direct current between said cathode and said workpiece, with said workpiece as the anode, until a coating of the desired thickness has been deposited onto said workpiece;
   (D) removing said workpiece from said composition;
   (E) drying said coating; and
   (F) curing said coating.

2. A method according to claim 1 wherein said electrodeposition is performed at about 10° to about 25° C.

3. A method according to claim 1 wherein said workpiece is a continuously moving wire.

4. A method according to claim 1 wherein said direct current is at a constant voltage of about 10 to about 300 volts.

5. A method according to claim 1 wherein said coating is cured in incremental temperature steps of about 5° C. per hour for about 40° C. up to about 300° C.

6. A method according to claim 1 wherein said workpiece is gallium arsenide.

7. A method according to claim 1 wherein said workpiece is a metal.

* * * * *